Nov. 23, 1965 C. H. KELLER ETAL 3,219,906
POWER CONVERSION DEVICE WITH VOLTAGE REGULATED OUTPUT
Filed Aug. 25, 1961 4 Sheets-Sheet 1
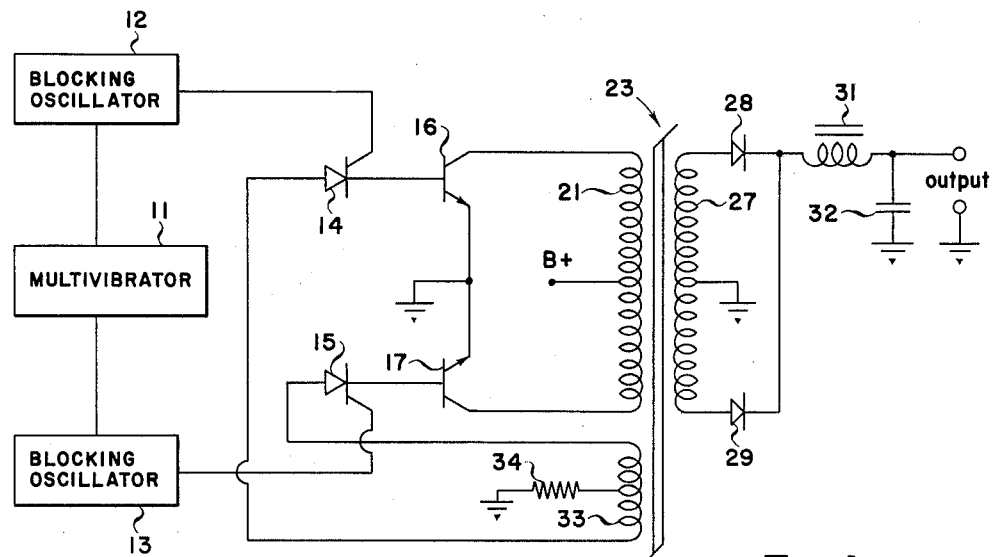
FIG. 1
FIG. 3
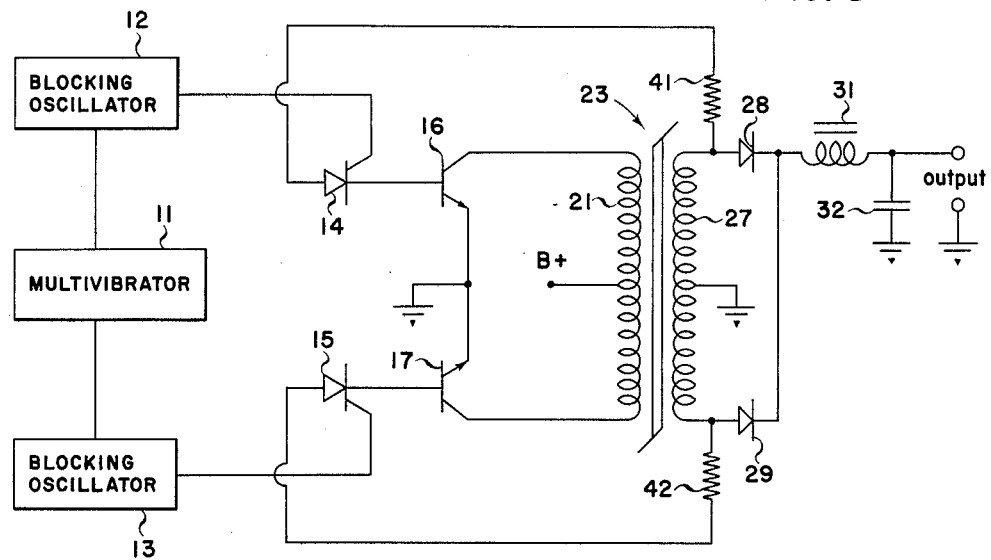
INVENTORS.
CARL H. KELLER
ELLIOT JOSEPHSON
BY
*George C. Sullivan*
Agent

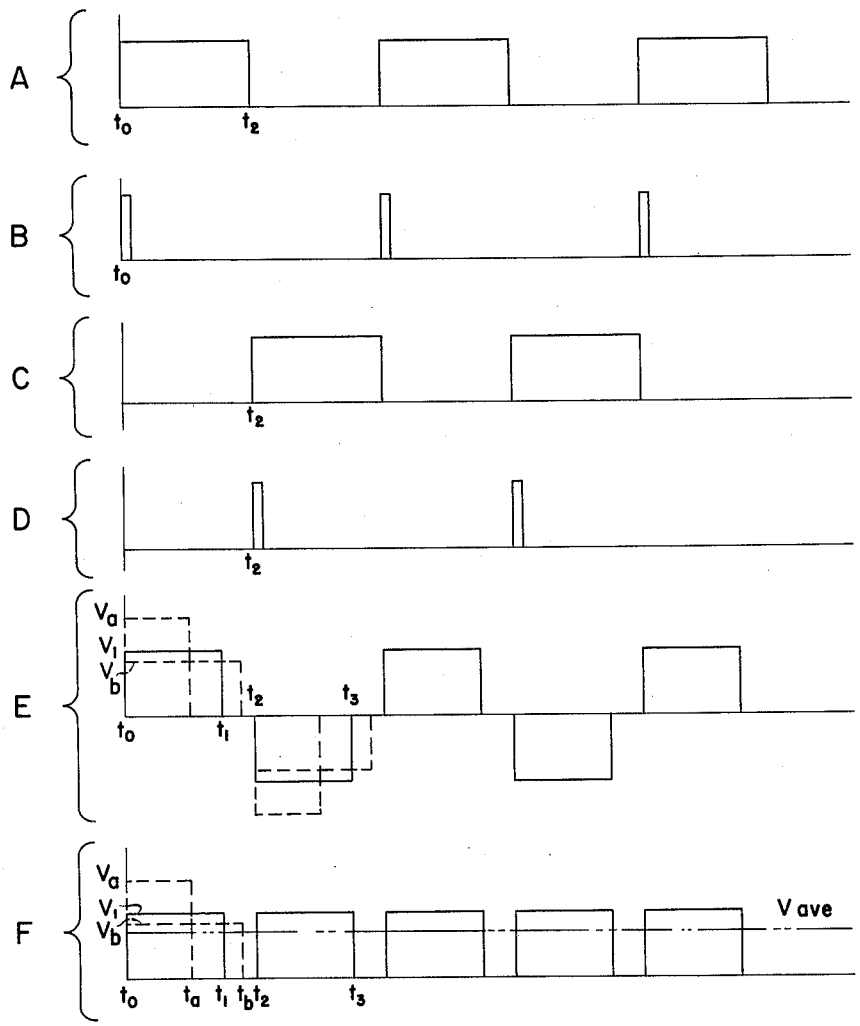

Nov. 23, 1965     C. H. KELLER ETAL     3,219,906
POWER CONVERSION DEVICE WITH VOLTAGE REGULATED OUTPUT
Filed Aug. 25, 1961                          4 Sheets-Sheet 4
Fig. 6
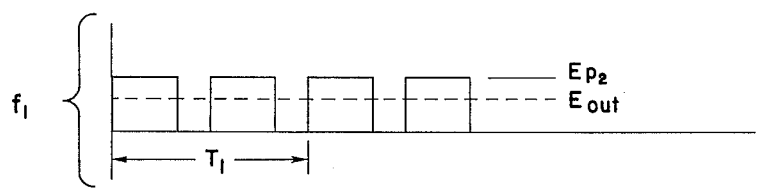
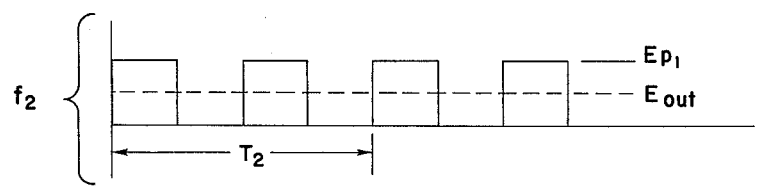
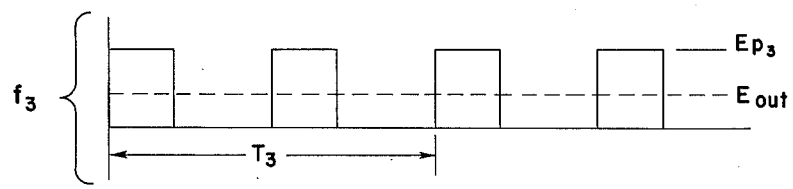
INVENTORS.
CARL H. KELLER
ELLIOT JOSEPHSON
BY
*George C. Sullivan*
Agent United States Patent Office 3,219,906
Patented Nov. 23, 1965

3,219,906
POWER CONVERSION DEVICE WITH VOLTAGE REGULATED OUTPUT
Carl H. Keller, Los Altos, and Elliot Josephson, Mountain View, Calif., assignors to Lockheed Aircraft Corporation, Burbank, Calif.
Filed Aug. 25, 1961, Ser. No. 133,927
3 Claims. (Cl. 321—16)

The present invention relates to a power conversion device and more particularly to a D.-C. converter capable of providing a constant voltage output irrespective of varying input voltages, ambient temperatures or loads.

The conventional method by which constant D.-C. output voltages are obtained with varying D.-C. input voltages is to employ a free-running D.-C. to D.-C. converter in combination with a series regulator. However, a series regulator for a 20 to 30 volt range of D.-C. input voltages drastically reduces the over-all power supply efficiency and results in generation of excessive heat for many applications.

The present invention obviates these disadvantages by employing a square loop core transformer having the characteristic wherein the product of the applied voltage and the switching time to saturation is constant. It has been discovered that this characteristic can be employed to regulate the output voltage, if the transformer, instead of being permitted to free-run as in conventional converters, is triggered at a constant frequency lower than the free-running frequency. In this manner output voltage regulation is possible without resorting to a power consuming series regulator. All embodiments of the present invention have this common characteristic and in one embodiment a feedback control is provided wherein additional regulation is provided to take into account varying ambient temperatures and output loads. In another embodiment, efficiency is further increased by directly supplying part of the output current from the input current source.

While the primary purpose of the present invention is to provide a D.-C. to D.-C. converter, as will hereinafter become apparent the unique feature of the present invention may be employed to obtain a regulated A.-C. signal from the secondary output.

Accordingly, an object of the present invention is to provide an efficient converter.

Another object of the present invention is to provide an efficient D.-C. to D.-C. converter.

Still another object of the present invention is to provide a converter device which is triggered at a frequency lower than the free-running frequency.

Still another object of the present invention is to provide an inverter device having a transformer wherein the product of the applied voltage and switching time is constant and varying the duration of current input to the transformer as a function of the applied voltage to maintain a constant voltage output.

A further object of the present invention is to provide an inverter which maintains a constant output voltage irrespective of changes in input voltages, ambient temperatures or output loads.

The specific nature of the invention, as well as other objects, uses and advantages thereof, will clearly appear from the following description and from the accompanying drawing in which:

FIGURE 1 is a schematic illustration of one embodiment of the present invention.

FIGURE 2 is a diagram used to illustrate the operation of the FIGURE 1 embodiment.

FIGURE 3 is a schematic illustration of a modification of the FIGURE 1 embodiment showing another technique by which feedback signals may be obtained.

FIGURE 6 is a diagram used to illustrate the operation of the FIGURE 5 embodiment.

Like numerals designate like elements throughout the figures of the drawing.

Figure 4:
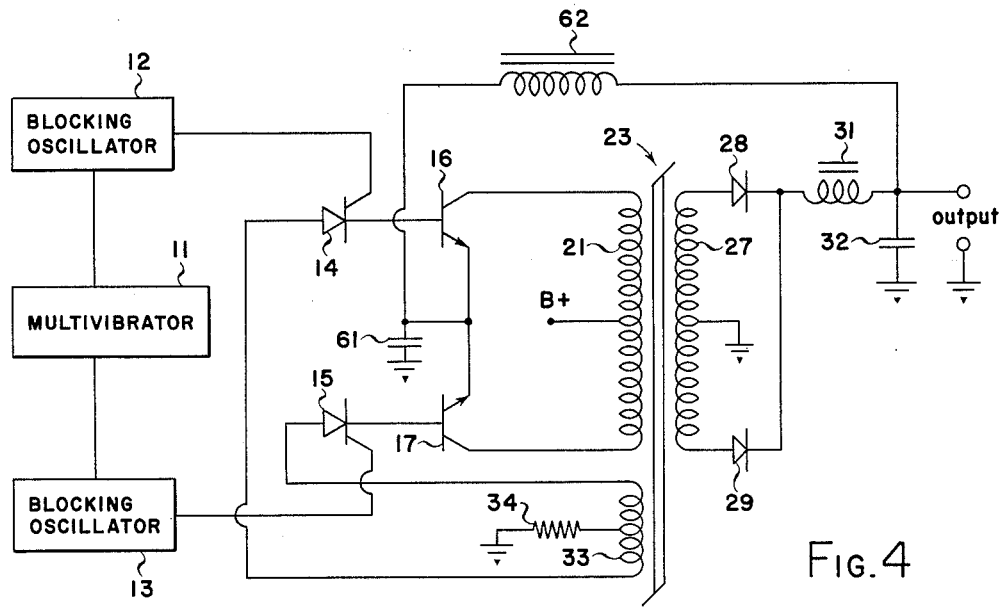
FIGURE 4 is a schematic illustration of another embodiment of the present invention having a particularly high efficiency.

In FIGURE 1 is one embodiment of the D.-C. to D.-C. converter of the present invention. The outputs of multivibrator 11 are operatively connected to the respective inputs of blocking oscillators 12 and 13. The outputs of blocking oscillators 12 and 13 are respectively connected to the gates of silicon controlled rectifiers 14 and 15. Specific operation of the silicon controlled rectifiers will not be described since such operation is well known to those skilled in the art. The cathodes of silicon controlled rectifiers 14 and 15 are respectively coupled to the bases of transistors 16 and 17. Opposite ends of primary winding 21 of square loop core transformer 23 are connected to the collectors of transistors 16 and 17. Primary winding 21 is center tapped and connected to the B+ power supply and the emitters of transistors 16 and 17 are connected to ground. Secondary winding 27 is center tapped to ground and the opposite ends thereof are connected to the anodes of diodes 28 and 29. The cathodes of diodes 28 and 29 are connected to one end of choke coil 31 and the other end of choke coil 31 is connected to an output terminal and through capacitor 32 to ground. Secondary winding 33 is center tapped through resistor 34 to ground and the opposite ends thereof are connected to the anodes of silicon controlled rectifiers 14 and 15.

Since the power provided by this device is relatively large, it is necessary to employ transistors capable of conveying large currents. The base current required to trigger large current capacity transistors is generally greater than the capacity of acceptable multivibrators. In addition, multivibrators continuously draw current whereas blocking oscillators draw current only during a short period of time. Therefore, the combination of multivibrator 11 and blocking oscillators 12 and 13 are used wherein the continuous power consumed by the multivibrator is small since blocking oscillators require little power for triggering. In addition, while the unit power delivered by the blocking oscillator is relatively large, it delivers this power only during short periods of time and therefore the average power consumed is small.

*Operation*

It should be initially noted that the D.-C. to D.-C. converter of FIGURE 1 is not permitted to free-run as in conventional square loop converters, but rather, it is controlled by a separate frequency source the frequency of which is lower than the free-running frequency.

Upon alternate changing of state of multivibrator 11, blocking oscillators 12 and 13 are alternately triggered thereby providing alternate output voltage spikes at a constant frequency. The voltage outputs from multivibrator 11 which are applied to blocking oscillators 12 and 13 are represented in curves "A" and "C," respectively. The voltage output spikes from blocking oscillators 12 and 13 are respectively represented in curves "B" and "D."

When a voltage spike from blocking oscillator 12 occurs, current passes from the gate to the cathode of silicon controlled rectifier 14, through the base-emitter of transistor 16 to ground. Therefore transistor 16 is turned "on" and current passes through the upper half of primary winding 21 thereby inducing a voltage in secondary winding 27 and feedback winding 33. Current then passes through the lower half of feedback winding 33 through the anode-cathode of silicon controlled rectifier 14, through the base-emitter of transistor 16 to ground and through current limiting resistor 34. Therefore, since silicon controlled rectifier 14 and transistor 16 are forward biased, they will remain conducting until transformer 23 becomes saturated. When transformer 23 becomes saturated there is no voltage induced in feedback winding 33 and both silicon controlled rectifier 14 and transistor 16 will be turned "off." It will be particularly noted that the feedback current maintains transistor 16 conducting after termination of the pulse from blocking oscillator 12. In FIGURE 2, curve "E" is illustrated as the voltage induced in secondary winding 27 over several cycles of operation. It is assumed the voltage induced in the secondary is positive when current is passing through the upper half of primary winding 21 and transistor 16. Neglecting slight time delays, the time $t_0$ represents the time when the output pulse from blocking oscillator 12 occurred and the time $t_1$ represents the time when transformer 23 became saturated.

Perhaps the most unique feature of the present invention resides not in the above-described feedback blocking oscillator arrangement, but rather, resides in the unique utilization of the constant volt-second product characteristic of the square loop core transformer.

By the unique implementation of this characteristic the rectified transformers' secondary voltage will remain constant over a wide range of input voltage variation. This is accomplished since the conduction time of transistors 16 and 17 are automatically adjusted to the required conduction time duration by virtue of the square loop core transformer having a constant volt-second product characteristic. This constant volt-second product may be expressed by the relationship:

(1) $$Vt=K$$

In order to illustrate this automatic adjustment, assume the B+ voltage is $V_a$ for one condition and $V_b$ for another condition of operation. Assuming $V_a$ is greater than $V_b (V_a > V_b)$ then (2) $$V_a t_a = V_b t_b = K$$

and (3) $$t_a < t_b$$

where $t_a$ and $t_b$ are the time durations required for transformer saturation where the B+ voltages are $V_a$ and $V_b$, respectively.

Since these relationships are linear, it will be apparent that the average or filtered voltage output will remain constant irrespective of change in B+ voltage. This is illustrated in FIGURE 2 curves E and F, where the dotted lines illustrate a B+ voltage of $V_a$, the solid lines a B+ voltage of $V_1$ and the dashed lines of B+ voltage of $V_b$. In like manner from graphical techniques it can be seen the average voltage $V_{ave}$ will remain constant irrespective of changes in B+ voltage.

In FIGURE 3 is shown another embodiment of the present invention. This embodiment differs from the FIGURE 1 embodiment by utilizing secondary winding 27, rather than a separate feedback winding, to provide the drive current for controlling the conduction time of transistors 16 and 17. This is accomplished by taking the feedback current from the opposite ends of secondary winding 27 and applying this feedback current through current limiting resistors 41 and 42 to the anodes of silicon controlled rectifiers 14 and 15 respectively. The operation of this embodiment is the same as the embodiment shown in FIGURE 1 and will therefore not be described.

In FIGURE 4 is shown still another embodiment of the present invention wherein capacitor 61 is employed to increase the over-all efficiency by diverting the primary winding current past the secondary winding and directly to the load. This increases the efficiency since losses are not then obtained in the secondary winding 27, diodes 28 and 29 and choke coil 31 for that portion of the by-passed load current.

From FIGURE 4 it can be seen that one side of capacitor 61 is connected to ground, and the other side is connected to the emitters of transistors 16 and 17 and through choke coil 62 to the output load.

For this embodiment to operate it is necessary that the output voltage be less than the input voltage or the transformer be of the step down type. In operation capacitor 61 charges to the output potential and D.-C. current is by-passed from the B+ source through alternate ends of primary winding 21, through the collector-emitter of each transistor, during alternate half cycles, through choke coil 62 and through the load to ground. It will also be appreciated that capacitor 61 functions to back bias the transistors to render them completely non-conducting during the off period and also permits greater voltage to be applied to the collectors thereof. Choke coil 62 functions to prevent voltage spikes from being transmitted to the output load.

It is preferable to employ capacitor 61 and choke 62 since the voltage applied to the output is more free of ripple. However, these components may be excluded whereby the power is then taken directly from the emitters of the transistors to the output load.

As previously explained, the embodiments of FIGURES 1, 3 and 4 provide a D.-C. voltage output which remains constant irrespective of change in B+ voltage. However, the relationships set forth in Equations 1 through 3 hold only at a predetermined temperature. In addition, when there is change in output load there will be change in the output voltage. For example, when the output load increases, the output voltage will drop slightly since the current increases with a resulting greater voltage drop in choke coil 31 and across the diodes. In order to maintain constant output voltage irrespective of change in the ambient temperature and load parameters, the embodiment shown in FIGURE 5 employs a technique for varying the multivibrator frequency in response to changes in output voltage. This is accomplished by a conventional control device 51 which compares the filtered output voltage with a predetermined standard (for example, a zener diode having a predetermined breakdown voltage) and applies the differential voltage to the input of the multivibrator to control the frequency thereof.

The details of control device 51 and multivibrator 11 are not presented since the particular construction of these devices are not considered a part of the present invention and the operation of each is conventional and well known to those skilled in the art. It will be understood that control device 51 may provide an increasing or decreasing output signal with a decreasing filtered output signal or vice versa. In addition, it will be understood that multivibrator 11 may provide an increasing or decreasing frequency in response to an increasing signal from control device 51 or vice versa. However, it is the critical and unique feature of the present invention that when the filtered output voltage decreases, the frequency of multivibrator 11 increases and conversely, when the filtered output voltage increases, the multivibrator frequency decreases.

The operation of the FIGURE 5 circuit will be explained in conjunction with the curves shown in FIGURE 6. In order to more clearly illustrate this operation, it is assumed the B+ power remains constant and the voltage amplitude therefore likewise remains constant. In FIGURE 6 are shown three curves which illustrate three different frequencies of operation wherein $f_1 > f_2 > f_3$ for different conditions of load and/or temperature. Assume the curve denoted by the frequency $f_2$ represents operation during normal load and normal temperature wherein the time $t_2$ represents the time period between pulses and the dotted line, denoted as $E_{out}$, represents the actual and desired filtered output voltage.

Assuming there is a load and/or temperature increase, the output voltage from the rectifier circuit will decrease and the filtered output voltage will decrease slightly below the desired $E_{out}$ value. This voltage decrease is sensed by control device 51 which applies a control signal to multivibrator 11 causing the frequency thereof to increase. In FIGURE 6, curve $f_1$ illustrates the output voltage from the rectifier circuit when the output load is relatively large. It can be seen that the peak voltage $Ep_2$ has decreased below the peak voltage $Ep_1$ (curve $f_2$) due to the increased system voltage drops. However, the frequency of operation has increased to a value of $$f_1 = \frac{1}{T_1}$$

and the time duration of each pulse remains constant since the value of B+ remains constant (also assuming no change in primary winding losses). Therefore, the dead space or time between pulses has decreased such that the filtered output voltage $E_{out}$ will remain the same as during the normal load operation illustrated in the $f_2$ curve of FIGURE 6.

In the $f_3$ curve of FIGURE 6 is illustrated the rectified voltage output when there is a load and/or temperature decrease below the normal values thereof. It can be seen that peak voltage $Ep_3$ has increased to a value greater than peak voltage $Ep_1$ which is obtained during normal load. However, the frequency of operation $$f_3 = \frac{1}{T_3}$$

has decreased and therefore the period of time between pulses has increased and the filtered output voltage $E_{out}$ will remain the same as when operating during normal load.

Figure 5:
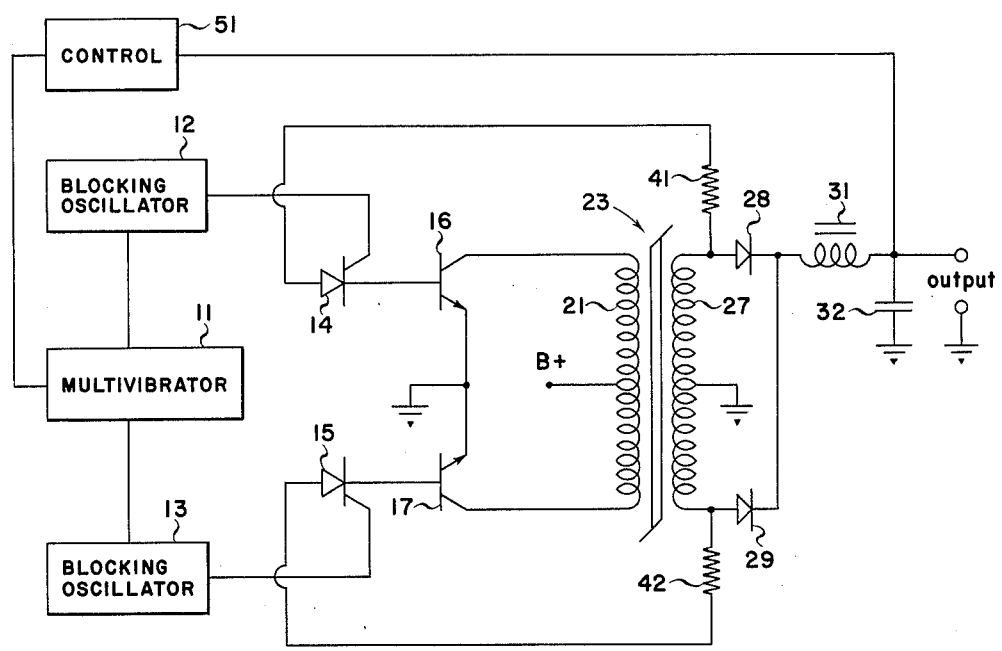
FIGURE 5 is a schematic illustration of still another embodiment of the present invention which has particular applicability when the ambient temperature and output load are subject to variations.

It will be particularly noted that the FIGURE 5 embodiment has the unique characteristic of being able to provide a manually adjustable regulated output voltage without resorting to power consuming devices as is necessary with free-running converters. This manual adjustment may be accomplished by merely varying the frequency of the multivibrator as hereinbefore explained.

As frequently encountered in actual practice of this embodiment, there may be simultaneous variations of B+ voltage, ambient temperature and output load. Operation during simultaneous changes in these parameters will be readily understood from combining the operations described with relation to FIGURES 2 and 6.

It is to be understood in connection with this invention that the embodiments shown are only exemplary, and that various modifications can be made in construction and arrangement within the scope of the invention as defined in the appended claims.

What is claimed is:
1. A D.-C. inverter comprising a transformer having an input winding, an output winding a core having the characteristic of the product of the applied voltage and the switching time to saturation being about constant, one side of said D.-C. power source operatively connected to the center tap of said input winding, a first transistor having the collector connected to one end of said input winding and the emitter connected to the other side of said D.-C. power source, a second transistor having the collector connected to the other end of said input winding and the emitter connected to the other side of said D.-C. power source, first and second silicon controlled rectifiers respectively operatively connected to the bases of said first and second transistors for turning said first and second transistors in the "on" and "off" positions, means operatively connected to said transformer and sensing the saturation states of said transformer, said means operatively connected to said silicon controlled rectifiers for turning "off" said first and second transistors.

2. The device set forth in claim 1 wherein said means consists of a winding disposed in flux sensing proximity with relaiton to said core, one end of said winding connected to the anode of said first silicon controlled rectifier and the other end of said winding operatively connected to the anode of said second silicon controlled rectifier.

3. The device in claim 2 including pulse means for providing voltage signals at a constant frequency wherein alternate pulses from said pulse means are respectively applied to the gates of said silicon controlled rectifiers for triggering said silicon controlled rectifiers into the "on" condition.

References Cited by the Examiner

UNITED STATES PATENTS

| 2,748,274 | 5/1956 | Pearlman | 321—2 |
| 2,971,166 | 2/1961 | Schultz | 321—2 X |
| 2,983,860 | 5/1961 | Todd | 321—49 |
| 3,030,589 | 3/1962 | Kadri. | |
| 3,048,764 | 8/1962 | Murphy | 321—2 |
| 3,079,525 | 2/1963 | Tap | 321—45 X |
| 3,117,270 | 1/1964 | Tailleur | 321—2 |

FOREIGN PATENTS

| 1,110,298 | 7/1961 | Germany. |

LLOYD McCOLLUM, *Primary Examiner.*

ROBERT L. SIMS, *Examiner.*